(12) United States Patent
Tanabe

(10) Patent No.: US 9,681,006 B2
(45) Date of Patent: Jun. 13, 2017

(54) PRINT CONTROL APPARATUS, PRINT CONTROL METHOD, AND PROGRAM

(71) Applicant: CANON KABUSHIKI KAISHA, Tokyo (JP)

(72) Inventor: Masaki Tanabe, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,047

(22) Filed: Dec. 1, 2015

(65) Prior Publication Data

US 2016/0165070 A1    Jun. 9, 2016

(30) Foreign Application Priority Data

Dec. 3, 2014  (JP) ................................ 2014-245207

(51) Int. Cl.
| | | |
|---|---|---|
| G06K 15/00 | (2006.01) | |
| H04N 1/00 | (2006.01) | |
| B41J 29/393 | (2006.01) | |
| G06K 15/02 | (2006.01) | |

(52) U.S. Cl.
CPC ........ *H04N 1/00005* (2013.01); *B41J 29/393* (2013.01); *G06K 15/408* (2013.01); *H04N 1/00023* (2013.01); *H04N 1/00037* (2013.01); *H04N 1/00045* (2013.01); *G06K 15/027* (2013.01)

(58) Field of Classification Search
USPC ...................................................... 358/1.14
See application file for complete search history.

(56) References Cited

U.S. PATENT DOCUMENTS

| | | | | |
|---|---|---|---|---|
| 2004/0090475 | A1* | 5/2004 | Ioka ..................... | B41J 2/04505 347/5 |
| 2009/0282305 | A1* | 11/2009 | Chen .................. | G06F 11/1068 714/718 |
| 2010/0225691 | A1* | 9/2010 | Wright .................. | B41J 2/2146 347/14 |
| 2010/0231635 | A1* | 9/2010 | Ramakrishnan ....... | B41J 29/393 347/19 |
| 2013/0148996 | A1* | 6/2013 | Masui ............... | G03G 15/0189 399/72 |
| 2013/0155139 | A1* | 6/2013 | Elliot .................... | B41J 2/2146 347/19 |

FOREIGN PATENT DOCUMENTS

| | | | | |
|---|---|---|---|---|
| JP | 404157675 | * | 5/1992 | ............ G11B 20/18 |
| JP | 2011-27798 A | | 2/2011 | |

* cited by examiner

*Primary Examiner* — Jerome Grant, II
(74) *Attorney, Agent, or Firm* — Canon U.S.A., Inc. IP Division

(57) ABSTRACT

A control apparatus includes a first determining unit that determines whether a defect has occurred in an image based on print data printed on a sheet by a printing unit having print heads including a row of nozzles aligned in a direction crossing a sheet conveyance direction. A first instructing unit instructs printing of a test pattern to a print control unit configured to control the printing unit if the first determining unit determines that a defect has occurred in the image. A second determining unit determines whether a defect occurs in a test pattern printed on the sheet by the printing unit based on the instruction from the instruction unit. A second instructing unit instructs stoppage of printing to the print control unit if the second determining unit determines that a defect has occurred in the test pattern.

12 Claims, 11 Drawing Sheets

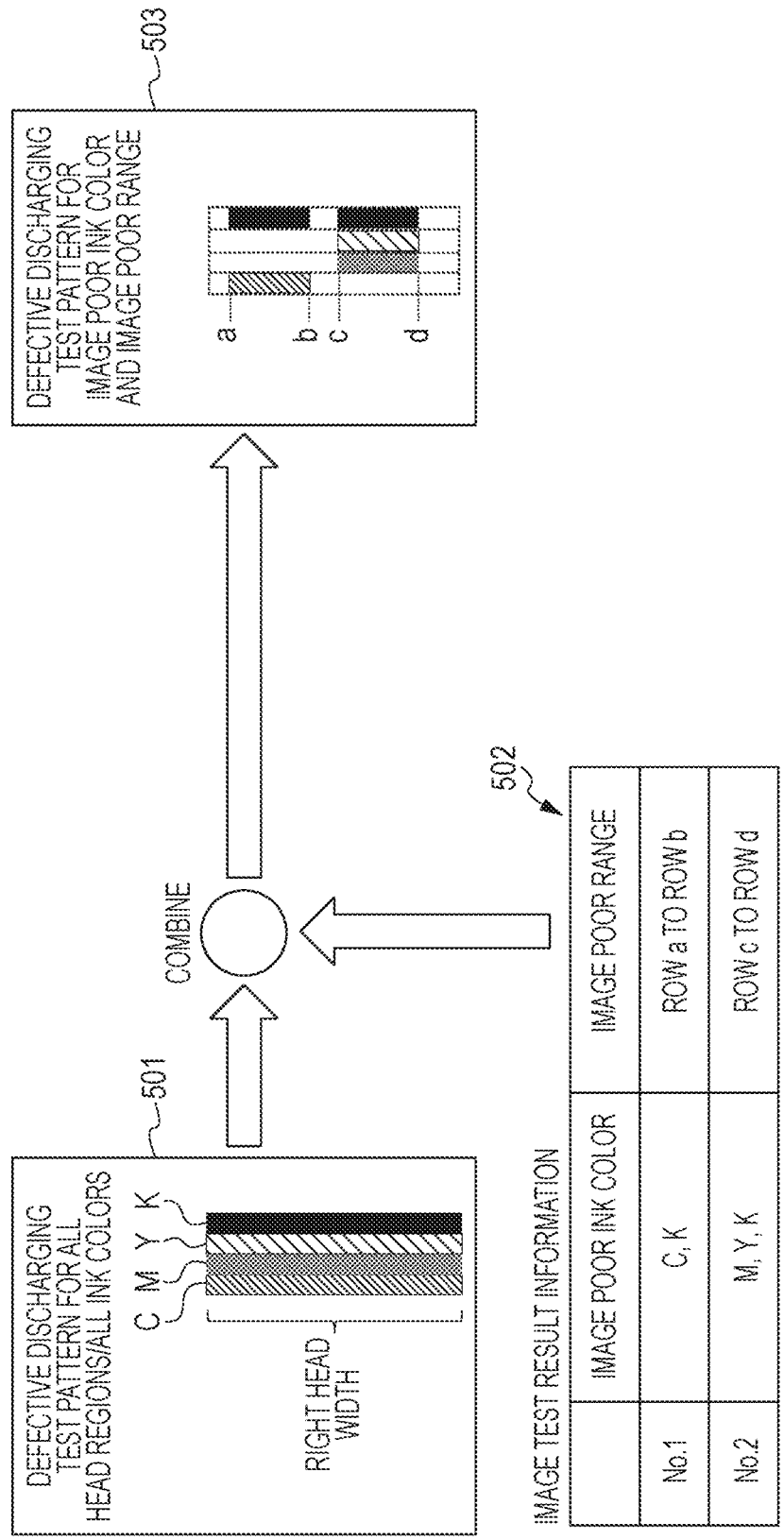

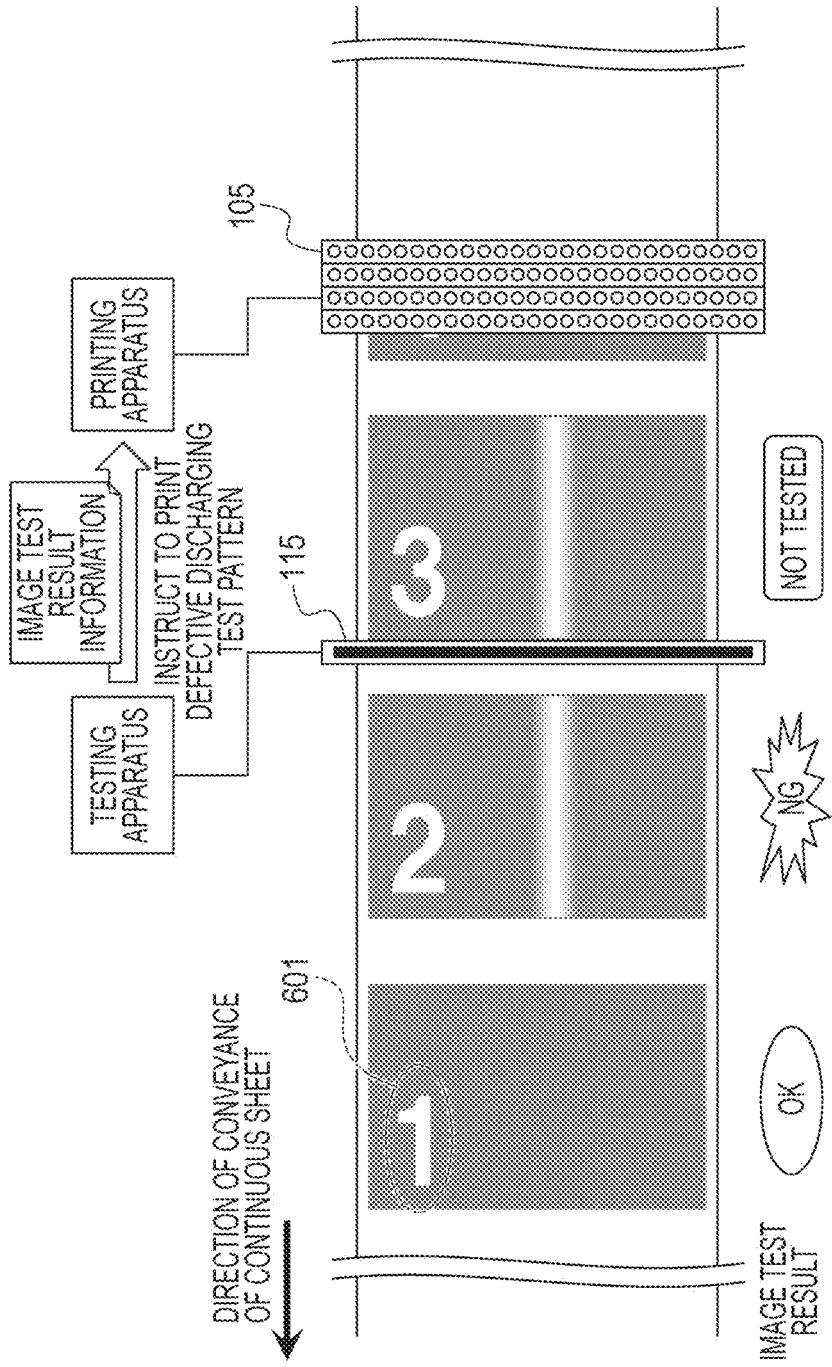

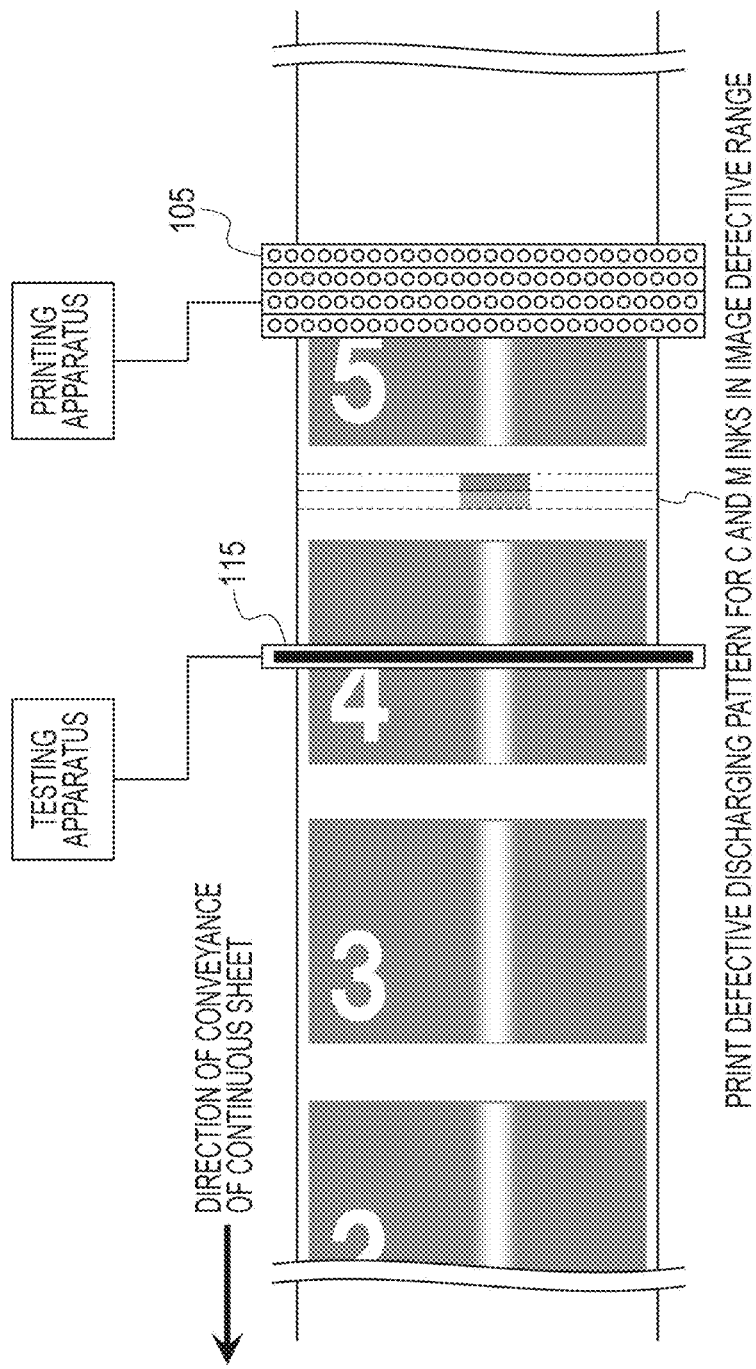

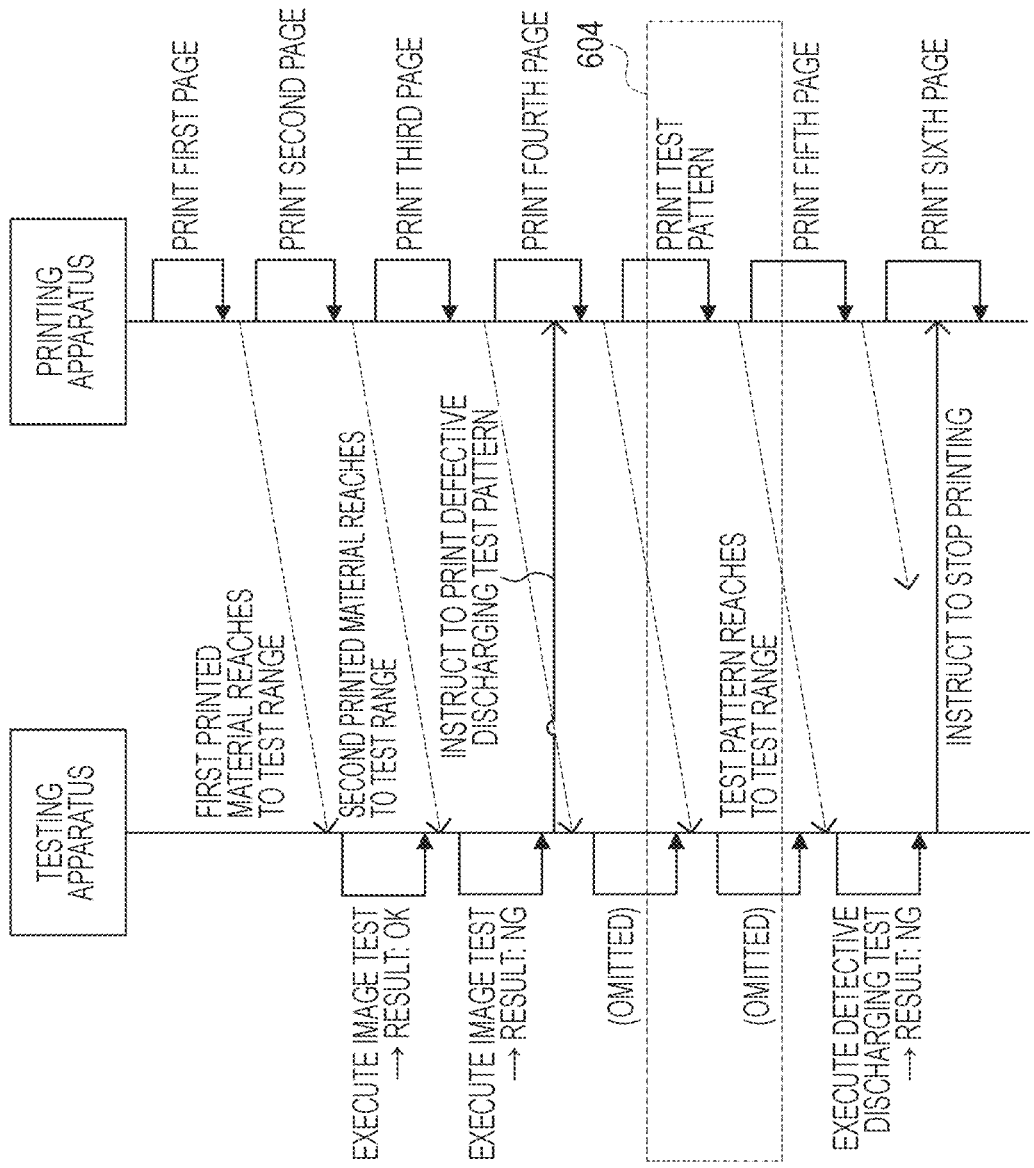

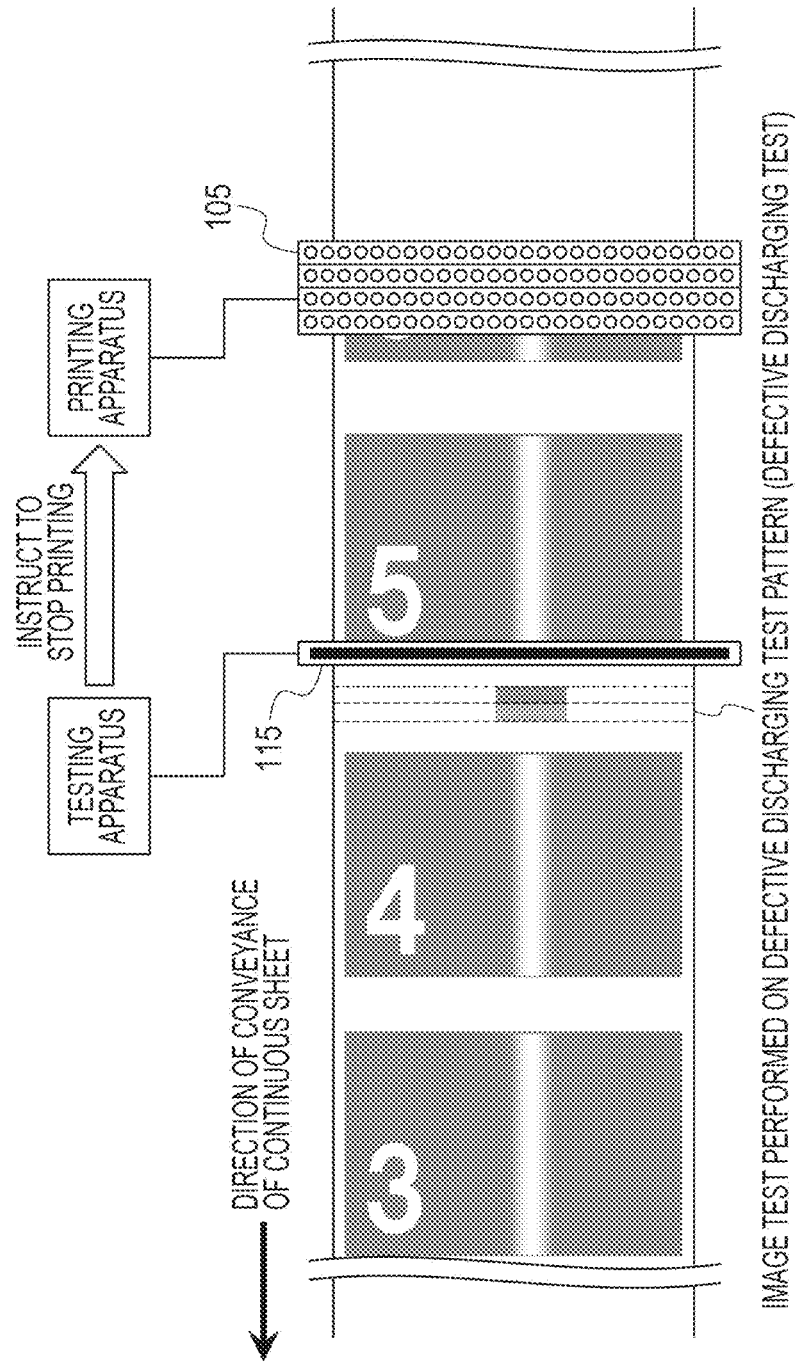

US 9,681,006 B2

PRINT CONTROL APPARATUS, PRINT CONTROL METHOD, AND PROGRAM

BACKGROUND OF THE INVENTION

Field of the Invention

The present invention relates to a print control apparatus, a print control method and a program for printing an image on a recording medium.

Description of the Related Art

In recent years, there has been a known printing system which includes a printing apparatus and a test apparatus. The test apparatus reads an image printed by the printing apparatus and sequentially examines the read image for defects. In such a printing system, when a defect is detected from an image, a cause of the defect is identified based on the range or type of the defect and whether it has occurred accidentally or continuously, for example, and the necessity for maintenance on the printing apparatus is determined. For this, in order for the test apparatus to identify the cause of a defect on an image, detection with high precision may be required.

Japanese Patent Laid-Open No. 2011-27798 discloses a method including selecting defect types in a stepwise manner by a user based on the occurrence state and a phenomenon of an image defect, then printing a test pattern associated with the selected defect type by the printing apparatus, and acquiring a test result from the printed test pattern.

Some ink-jet type printing apparatus may print on a continuous sheet such as roll paper by using a line head having nozzles aligned in a direction perpendicular to a sheet conveyance direction. In such a printing apparatus which handles a continuous sheet, a stoppage of a printing operation due to some cause during the printing operation may require some preparation operations such as reversing the continuous sheet on a conveyance route, pulling out the continuous sheet for starting the printing again and performing registration adjustment for discharging ink, which may take time and lower the print productivity, disadvantageously. It is important to prevent such a stoppage of the printing apparatus as much as possible for continuous operation time.

According to Japanese Patent Laid-Open No. 2011-27798, in order to improve the precision of detection of an image defect, a cause thereof is identified by stopping a normal printing operation once and then printing a special test pattern. However, such a printing apparatus handling a continuous sheet as described above in combination with a test apparatus according to the method is stopped every time when an image defect occurs. On the other hand, a printing apparatus which is not stopped at all even when an image defect occurs may produce a large amount of failed printed material though the operating time is not reduced, resulting in a higher false-related cost and requiring a higher cost for re-printing.

SUMMARY OF THE INVENTION

A control apparatus according to the present invention includes a first determining unit configured to determine whether a defect has occurred in an image based on print data printed on a sheet by a printing unit having print heads, the print heads having a row of nozzles aligned in a direction crossing a sheet conveyance direction, a first instructing unit configured to instruct printing of a test pattern to a print control unit configured to control the printing unit if the first determining unit determines that a defect has occurred in the image, a second determining unit configured to determine whether a defect has occurred in a test pattern printed on the sheet by the printing unit based on the instruction from the instruction unit, and a second instructing unit configured to instruct stoppage of the print control unit if the second determining unit determines that a defect has occurred in the test pattern.

Further features of the present invention will become apparent from the following description of exemplary embodiments with reference to the attached drawings.

BRIEF DESCRIPTION OF THE DRAWINGS

FIG. 5 illustrates a defective-discharging test pattern according to an embodiment of the present invention.

FIGS. 6A and 6B illustrate a positional relationship on a storage medium between an image to be printed and a defective-discharging test pattern and operations to be performed by a test apparatus and a printing apparatus according to an embodiment of the present invention.

FIGS. 7A and 7B illustrate a positional relationship on a storage medium between an image to be printed and a defective-discharging test pattern and operations to be performed by a test apparatus and a printing apparatus according to an embodiment of the present invention.

FIGS. 8A and 8B illustrate a positional relationship on a storage medium between an image to be printed and a defective-discharging test pattern and operations to be performed by a test apparatus and a printing apparatus according to an embodiment of the present invention.

DESCRIPTION OF THE EMBODIMENTS

First Embodiment

Figure 1:
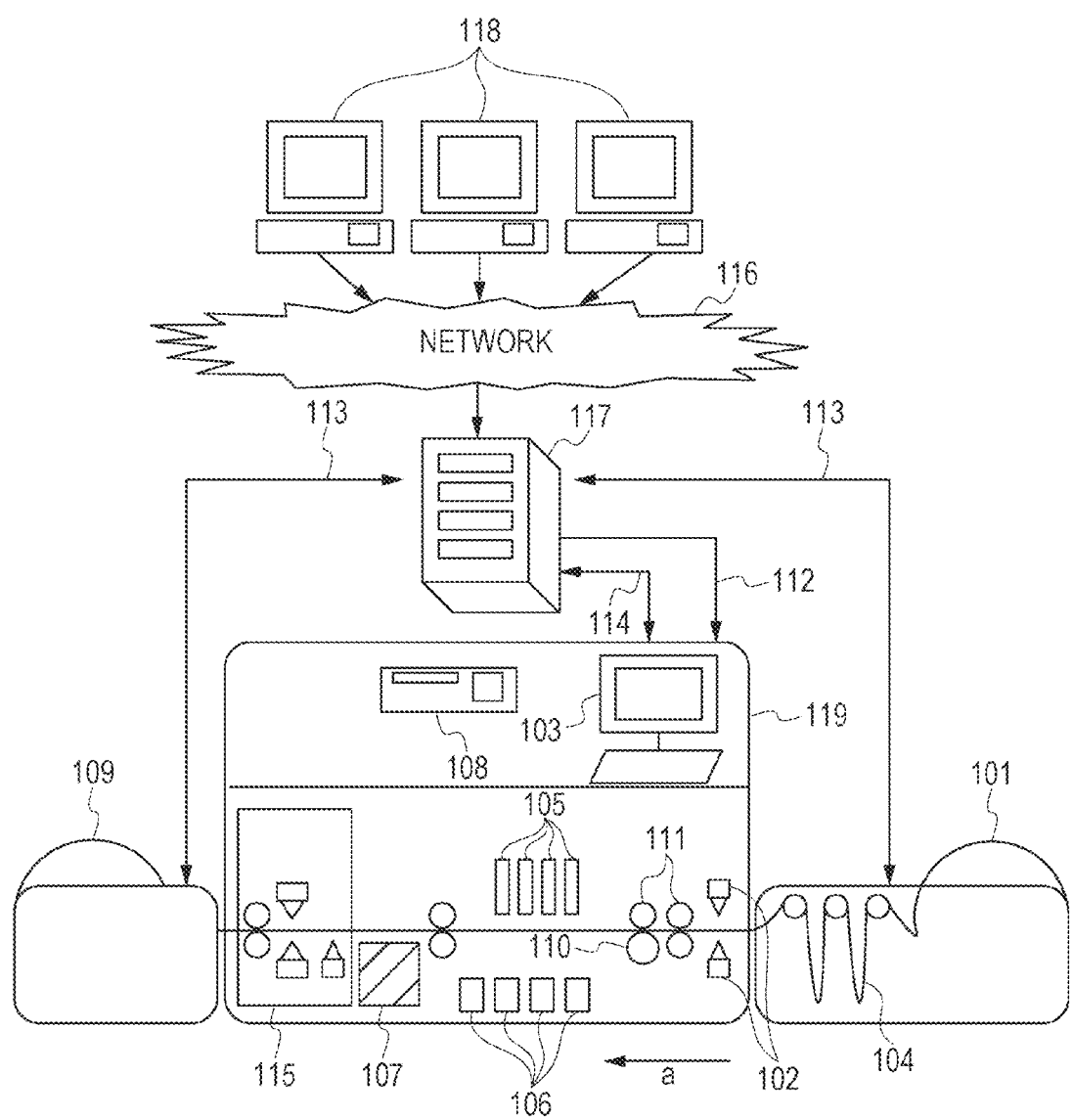
FIG. 1 is a schematic view illustrating a general configuration of a printing system according to an embodiment of the present invention.

FIG. 1 illustrates a schematic configuration of an exemplary printing system according to a first embodiment. A roll sheet is used, for example, as a recording agent (recording medium or recording sheet) on which print processing is performed according to this embodiment. However, without being limited to such a roll sheet, any long continuous sheet is applicable on which printing a plurality of pages on one side is performed without cutting the sheet during the printing processing. Various types of material which allow print processing thereon are applicable as a recording agent without being limited to paper. The printing processing is not limited to polychromatic printing using recording materials of a plurality of colors but may be monochromatic printing using a black (including gray) recording material only.

FIG. 1 is a cross section view schematically illustrating a general configuration of a printing system in which a roll sheet (or a continuous sheet longer than the length of a print unit (one page) in a conveyance direction) is used as a recording agent. The printing system includes components 101 to 119, which will be described below, and the components are disposed within a plurality of housings. The printing system has a printing apparatus 119, a feeding unit 101 configured to supply a roll sheet (hereinafter, a sheet), a winding unit 109 configured to wind a sheet having undergone printing processing, and a controller 117 configured to control the printing apparatus 119. According to this embodiment, the printing apparatus 119 includes an image test apparatus 115 configured to capture and check an image having undergone printing processing. The image test apparatus is not limited to one provided within the printing apparatus but may be provided externally to the printing apparatus and be coupled to the printing apparatus. The image test apparatus is configured to check an image by using a sensor, and the sensor may be an area sensor camera or a line sensor camera without limiting the type of sensor. The printing system is also connectable to an external device 118 over a network 116 configured to transmit a print job to the controller 117. The external device 118 may be a host computer for transmitting a print job, for example.

The housings will be described in more detail.

The external device 118 is a host computer configured to transmit a print job to the controller 117 over the network 116. The external device 118 may select an image to be printed and set a print size and a layout, for example, to generate a print job. According to this embodiment, a host computer over a network is configured to transmit a print job. However, an embodiment of the present invention is not limited thereto, but a host computer directly connected to the controller 117 or a portable medium such as a USB memory may be applied.

The network 116 is connected to the external device 118 for transmitting a job data to the controller 117, as described above. The network 116 may either be wired or wireless.

The controller 117 is a controller configured to control the printing apparatus 119 and execute RIP processing. The controller 117 transmits respective control commands to the printing apparatus 119, feeding unit 101, and winding unit 109 through corresponding control communication IFs 113 and 114 for controlling the apparatus and units. The controller 117 further transmits information regarding a print job and setting data necessary for printing and control to the printing apparatus 119 through the control communication IF 114. The controller 117 also acquires the apparatus state and information on whether a print job is being printed or has been printed already, for example, from the printing apparatus 119. The controller 117 performs RIP processing on a print job transmitted from the external device 118 and transmits image data having undergone the RIP processing to the printing apparatus 119 through a data communication interface (hereinafter, IF) 112. The RIP processing here refers to processing for converting a print job (print data) to a raster image format supported by the printing apparatus. The data communication IF 112 is configured by an interface, such as an optical fiber interface, capable of transmitting and receiving data at a high speed according to this embodiment because of the necessity for transmission of a large amount of image data.

The feeding unit 101 is configured to feed a sheet. A sheet mounted to a control bar within the feeding unit 101 by a user is filled in a main body of the feeding unit. The feeding unit 101 starts conveying the sheet in response to an instruction to start feeding from the controller 117 through the control communication IF 113. The feeding unit 101 includes a loop generation control unit 104 configured to absorb an error in transfer speed for adjustment of the transfer speed. According to this embodiment, loop control is provided in the feeding unit 101. However, a loop control unit configured to absorb an error in transfer speed may be provided within the printing apparatus 119. The sheet pulled out from the feeding unit is conveyed in the illustrated direction a and reaches the printing apparatus 119. According to this embodiment, a roll sheet is used in the feeding unit 101. However, a sheet which is not rolled and continuous may be fed.

A print job is transferred from the controller 117 to the printing apparatus 119 through the data communication interface 112. After that, the control unit 108 responsible for general control over the printing apparatus 119 performs image processing to acquire print data. For example, the control unit 108 performs print control over the printing apparatus 119.

The printing apparatus 119 has a sensor 102 configured to read a mark printed on a sheet, print heads 105 being printing units, ink tanks 106 configured to supply ink to the print heads 105, and a drying unit 107 configured to dry ink printed on a sheet. The printing apparatus 119 further has an encoder 110 configured to control a conveyance amount and a conveyance state, an operating unit 103, and a control unit 108.

The operating unit 103 is usable by a user for performing various operations and is configured to notify a user of various kinds of information.

The control unit 108 includes a controller (including a CPU or an MPU), an output device for user interface information (generator for display information and acoustic information), and I/O interfaces.

The printing apparatus 119 configured to print an image. The print heads 105 hold independent heads for a plurality of colors (four colors in this embodiment) along the sheet conveyance direction. According to this embodiment, the printing apparatus 119 has four print heads corresponding to four colors of C (cyan), M (magenta), Y (yellow), and K (black). Of course, other colors are applicable, and use of all of those colors is not necessary.

The print heads 105 are line heads for colors (four colors according to this embodiment) along the conveyance direction a in printing. The printing apparatus 119 according to this embodiment has a line head having an array of nozzles aligned in a direction crossing the sheet conveyance direction (orthogonal direction according to this embodiment). The line head for colors may be provided as a single seamless nozzle chip or as separate nozzle chips aligned or regularly arranged in staggered manner. According to this embodiment, the line head is a so-called full multi-head having nozzles aligned in a range covering the width of a print region of a sheet having a maximum size supported by the apparatus. The ink-jet system which discharges inks from nozzles may apply a heating element, a piezoelectric element, an electrostatic element or an MEMS element. Inks are discharged from nozzles in the head based on print data, but the timing of discharging is determined based on an output signal from the encoder 110 for conveyance.

The ink tanks 106 independently store inks of colors. Inks are supplied from the ink tanks 106 to sub-tanks each provided for a color through a tube, and inks are then supplied from the sub-tanks to the print heads 105.

In the printing apparatus 119, inks are discharged from the print heads 105 in synchronization with the conveyance of a sheet to form an image on the sheet. The print heads 105 are disposed at a position where inks are not discharged to the rotation roller 111. Instead of being directly discharged to a sheet, the inks after being applied to an intermediate transfer body may be applied to a sheet to form an image.

After an image is formed on a sheet, the sheet is conveyed to the drying unit 107. The drying unit 107 heats the sheet passing through inside of the drying unit 107 with hot air (heated gas (air)) to dry the sheet on which inks have been applied for a short period of time. Instead of drying with hot air, various ways of drying are applicable such as drying with cool air or heat generated by a heater, natural drying, irradiation of electromagnetic waves such as ultraviolet rays. After the drying of the image printed on the sheet ends, the sheet is conveyed to the image test apparatus 115.

In the image test apparatus 115, the image printed on the sheet is read and is checked. More specifically, an image printed on a sheet or a special pattern on the sheet may be optically read, and whether the printed image has any problem such as an image defect may be determined, and states of the apparatus including an ink discharge condition may be checked. Here, the term image defect refers to a state in which a target image is not acquired and below will also be referred as "image defect". According to this embodiment, the image test apparatus 115 has a function for checking an image on which a content of a print job is printed and a function for reading a special pattern for checking defective discharging of ink. The functions of the image test apparatus 115 will be described below in detail. If the image check performed by the image test apparatus 115 results in determination of NG (not good) with respect to the state of the image or the state of the apparatus, the image having a problematic state can be identified by a hole punched through the image or a mark given on the image. The check result may be notified to the controller 117 through the control communication IF 114.

After the reading and checking completes, the sheet is conveyed to the sheet winding unit 109. The sheet winding unit 109 starts its winding operation to wind the printed sheet in response to a winding instruction from the controller 117 through the control communication IF 113. Thus, the sheet on which an image has been printed by the printing apparatus 119 is rolled. Hereinafter, a position on a sheet and a sheet conveyance route close to the feeding unit 101 will be called "upstream", and the opposite side will be called "downstream".

Figure 2:
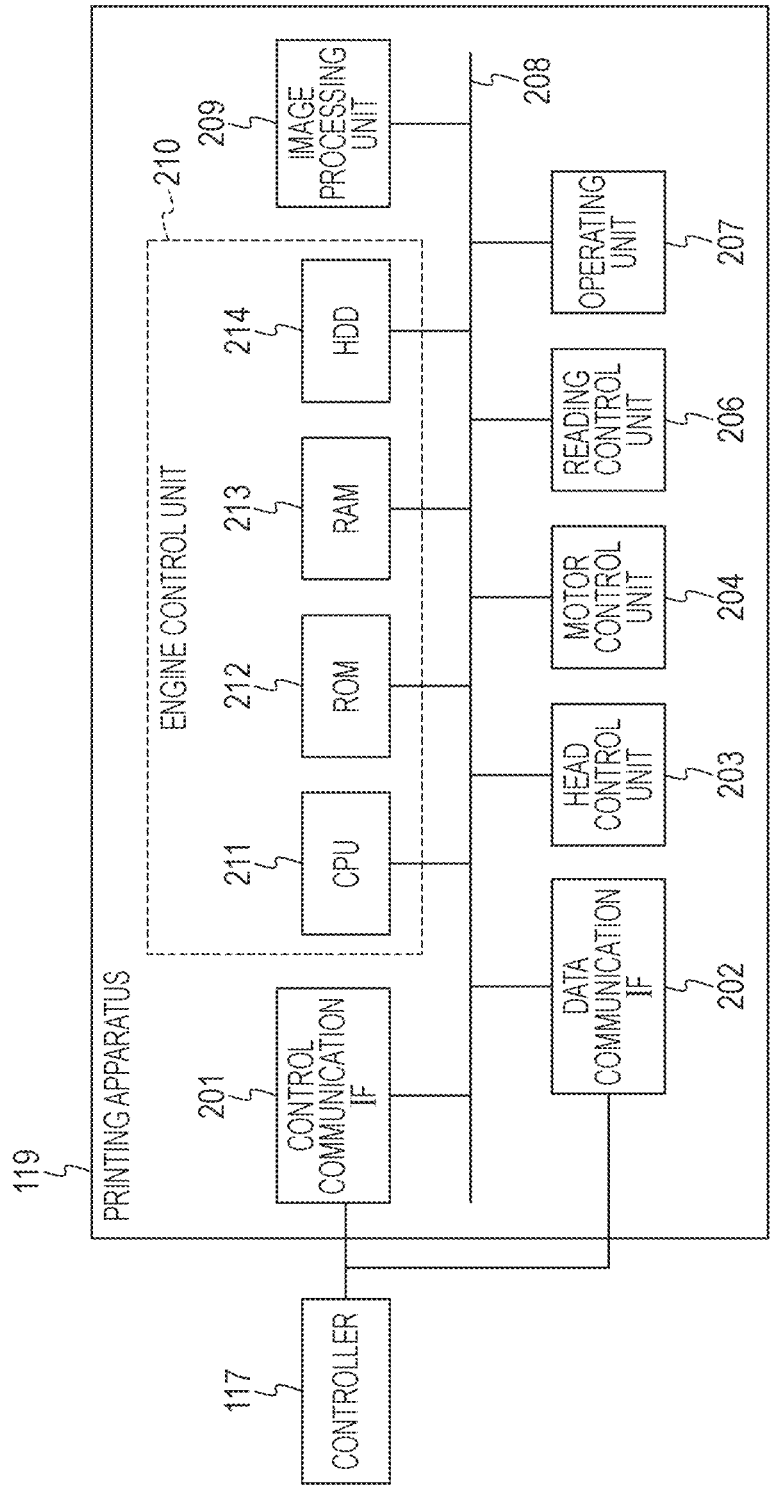
FIG. 2 is a block diagram illustrating a control configuration of a printing apparatus according to an embodiment of the present invention.

FIG. 2 is a block diagram illustrating a control configuration of the printing apparatus 119.

The printing apparatus 119 includes a control communication IF 201, a data communication IF 202, an engine control unit 210, a head control unit 203, a motor control unit 204, a reading control unit 206, an operating unit 207, and an image processing unit 209. These components are connected via a system bus 208.

The engine control unit 210, head control unit 203, motor control unit 204, and image processing unit 209 illustrated in FIG. 2 are mainly included in the control unit 108. The operating unit 207 and the reading control unit 206 are included in the operating unit 103 and the test apparatus 115, respectively.

The control communication IF 201 and data communication IF 202 are IFs for connecting the printing apparatus 119 to the controller 117. The control communication IF 201 is an interface configured to receive a control command and a status signal, for example, from the controller 117.

The data communication IF 202 is an interface configured to receive a print job from the controller 117.

The engine control unit 210 includes a CPU 211, a ROM 212, a RAM 213, and an HDD 214, and these components are connected via the system bus 208.

The CPU 211 performs operations and generally controls the printing apparatus 119. The ROM 212 stores control programs to be executed by the CPU 211 and fixed data necessary for operations to be performed by the printing apparatus 119. The RAM 213 may be used as a work area for the CPU 211 as a temporary storage region for various kinds of reception data and may store setting data. The HDD 214 may store parameters and tables, for example, necessary for operations to be performed by the printing apparatus.

The engine control unit 210 controls the head control unit 203, the motor control unit 204, and the reading control unit 206 in response to a control command received from the controller 117 through the control communication IF 201 and records print data on a recording medium.

The image processing unit 209 has a CPU, ROM, and RAM similarly to the engine control unit. The image processing unit 209 converts a color space (such as YCbCr) of a received print job to a standard RGB color space (such as sRGB). Various kinds of image processing such as resolution conversion to a valid pixel count, image analysis, and image correction may be performed as required. The print data acquired by performing such kinds of image processing is stored in the HDD 214.

The head control unit 203 performs drive control over the print heads 105 based on a control command received from the engine control unit 210 through the system bus 208 and print data having undergone image processing in the image processing unit 209. Thus, an image based on the print data is recorded on a recording medium.

The motor control unit 204 controls a sheet conveying mechanism such as drive control over the rotation roller 111 in response to a control command received from the engine control unit 210 through the system bus 208.

The reading control unit 206 detects an image or a control pattern printed on a recording medium in response to a control command received from the engine control unit 210 through the system bus 208. The reading control unit 206 may instruct the image processing unit 209 to perform color conversion and resolution conversion on an image that has been read.

The operating unit 207 is a user input/output IF and includes an input unit such as hardware keys and a touch panel, a display for presenting information and an output unit such as an audio generator. The operating unit 207 displays parameter settings necessary for operations to be performed by the printing apparatus, a printing state, and used paper.

According to this embodiment, the head control unit 203, motor control unit 204, and reading control unit 206 are controlled in response to a control command received from the controller 117 by the engine control unit 210. However, an embodiment of the present invention is not limited thereto. A control command may be exchanged between control units, and the control units may directly receive control commands from the controller 117.

Figure 3:
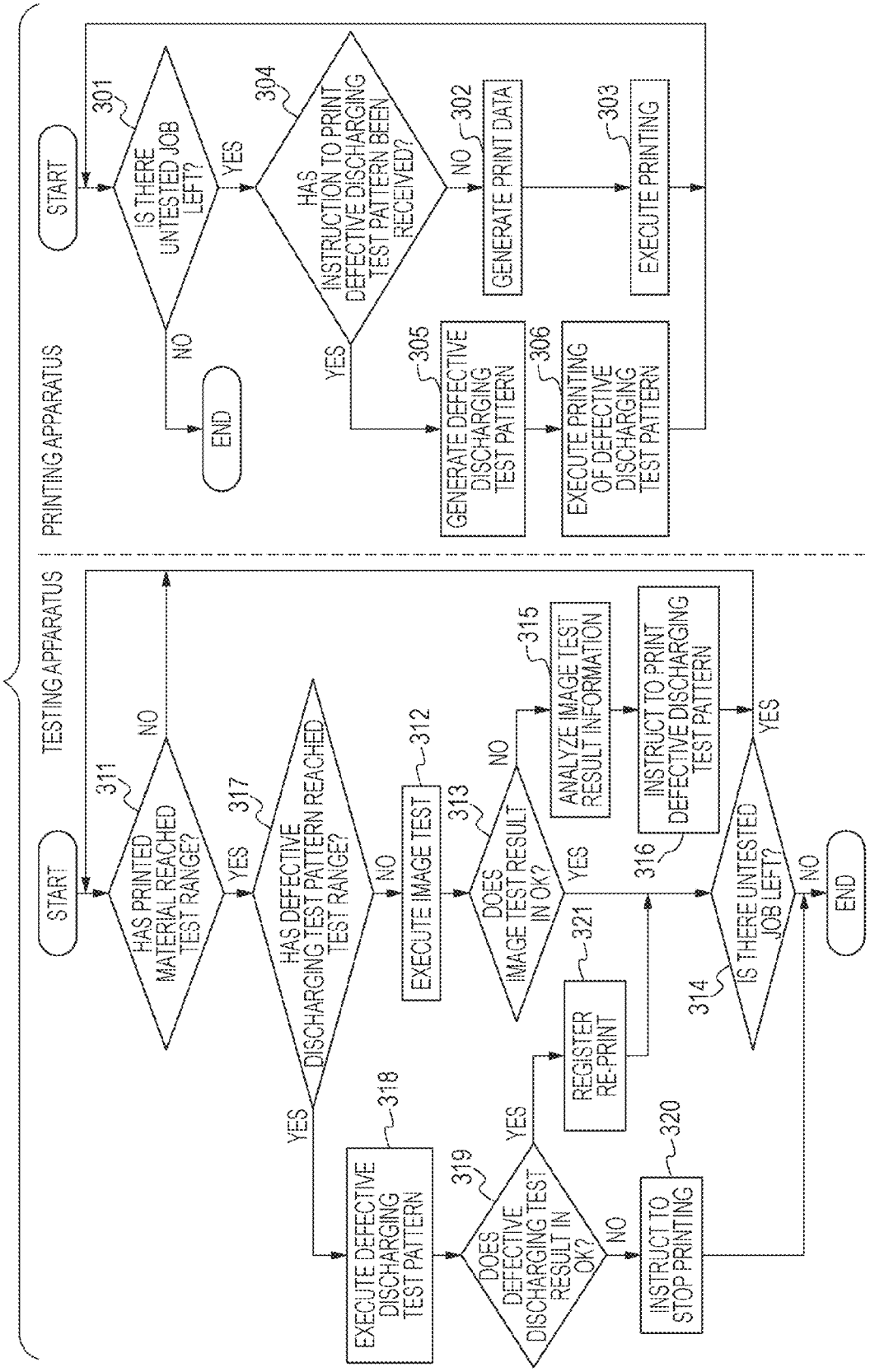
FIG. 3 is a flowchart illustrating processing to be performed by a test apparatus and a printing apparatus according to an embodiment of the present invention.

FIG. 3 illustrates flowcharts for the continuous sheet printing apparatus and test apparatus according to the present invention. The flowcharts in FIG. 3 illustrate flows of processing to be implemented by the CPU 211 by loading control programs stored in the ROM 212 to the RAM 213 and executing them.

The printing apparatus 119 starts a printing operation in response to a print execution instruction from a user or to detection that a print job is queued. Once the printing operation starts, received data on the RAM 213 is checked, and whether any incomplete print job is being queued or not is determined (step 301).

If no print job exists (No in step 301), the printing apparatus does not execute the printing operation. If a print job exists (Yes in step 301), the processing moves to S304.

In S304, whether an instruction to print a defective-discharging test pattern has been received or not is determined. If not (No in step 304), image processing is performed on the print job to acquire print data (step 302). Here, because the print data having undergone image processing is used as a correct image in an image test, the print data is stored in the HDD 214 until the image test on the print data ends. Next, the acquired print data is printed on a continuous sheet (step 303). Step 304 to step 306 will be described below.

When the printing apparatus 119 starts the printing operation, the test apparatus detects that the printing operation has started through the system bus 208 and then starts a detection operation. Whether the image being printed has reached a test range or not is determined (step 311). Whether an image being printed has reached a test range or not is determined based on information such as a time point when the print heads 105 have printed the image and the predicted image reach time, for example, transmitted by the CPU 211 to the test apparatus 115. It should be understood that the method for determining whether an image being printed has reached a test range or not is not limited thereto, but other methods are also applicable.

If it is detected that an image being printed has reached the test range (Yes in step 311), whether a defective-discharging test pattern has reached the test range or not is determined (step 317). Whether the defective-discharging test pattern has reached the test range or not may be determined based on information such as the time point when the print heads 105 have printed the defective-discharging test pattern and the predicted reach time defective-discharging test pattern reach time, for example, transmitted by the CPU 211 to the test apparatus. It should be understood that the method for determining the defective-discharging test pattern has reached the test range or not is not limited thereto, but other methods may be applicable.

If the defective-discharging test pattern has not reached the test range (No in step 317), an image test is executed on the printed image (step 312).

A method for executing an image test in step 312 according to this embodiment will be described with reference to FIGS. 4A to 4C. First, referring to FIG. 4A, a cumulative density graph at rows in a direction perpendicular to the conveyance direction of a continuous sheet is acquired. The cumulative density graph according to this embodiment represents a distribution of density values of a whole image where the direction perpendicular to the conveyance direction for a continuous sheet is defined as the x axis and cumulative values for rows are plotted along the y-axis. FIG. 4A illustrates a cumulative density graph in a case where one ink color is used for printing an image. FIG. 4B is a cumulative density graph in a case where a plurality of ink colors are used for printing an image. In a case where a plurality of ink colors are used for printing an image, ink color separation is performed on the acquired image, as illustrated in FIG. 4B, and cumulative density graphs corresponding to the ink colors are acquired. Cumulative density graphs are acquired for a correct image on the HDD 214. Here, the term "correct image" according to this embodiment refers to an image directly acquired from print data, that is, an image independent of its recorded state. In this case, the resolutions of a test image and the correct image are subjected to enlargement/reduction processing as required so that the resolutions can be matched in advance. The resolution of the x-axis of each of the cumulative density graphs depends on the matched resolution above. A graph acquired from the test image and the graph acquired from the correct image are compared to determine the presence/absence of a result of the printed image. If a difference of a predetermined value (threshold value) or higher occurs at least at one row, it is determined that an image defect is present (or the test result is determined as NG). If the differences at all rows are lower than the predetermined value, the absence of an image defect is determined (or the test result is determined as OK). The predetermined value (threshold value) may be a fixed value prestored in the ROM 212 or may be an externally editable value. The predetermined value may be set in accordance with the desirable quality of the target image. In order to acquire a high-quality image, the predetermined value may be set lower. It should be noted that an equal predetermined value may be used for all ink colors, or a different value may be used for each ink color. For example, in order to acquire a high-quality image in a specific color, the predetermined value for the color may be set lower. For a color with a large tolerable error, the predetermined value for the color may be set high.

Figure 4C:
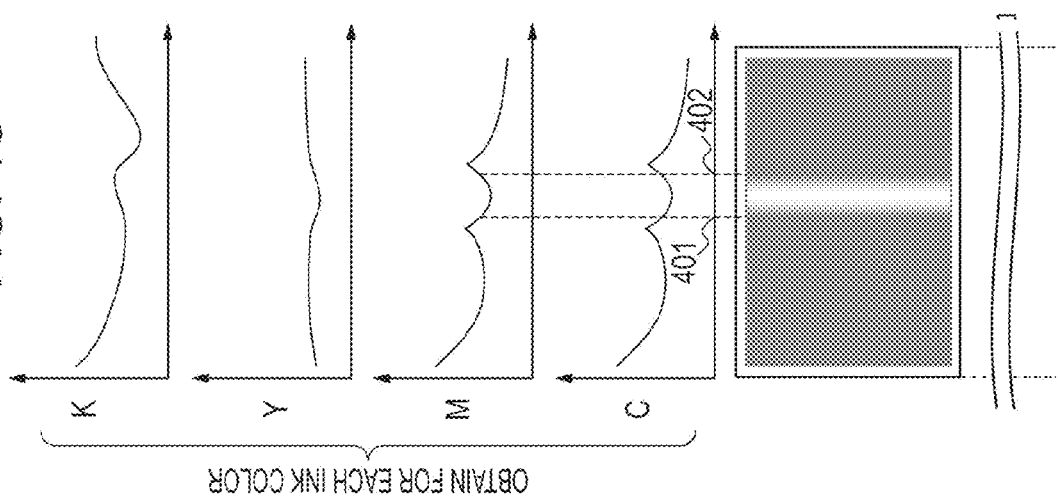
FIGS. 4A to 4C illustrate cumulative density value graphs usable for testing an image according to an embodiment of the present invention.
Figure 4B:
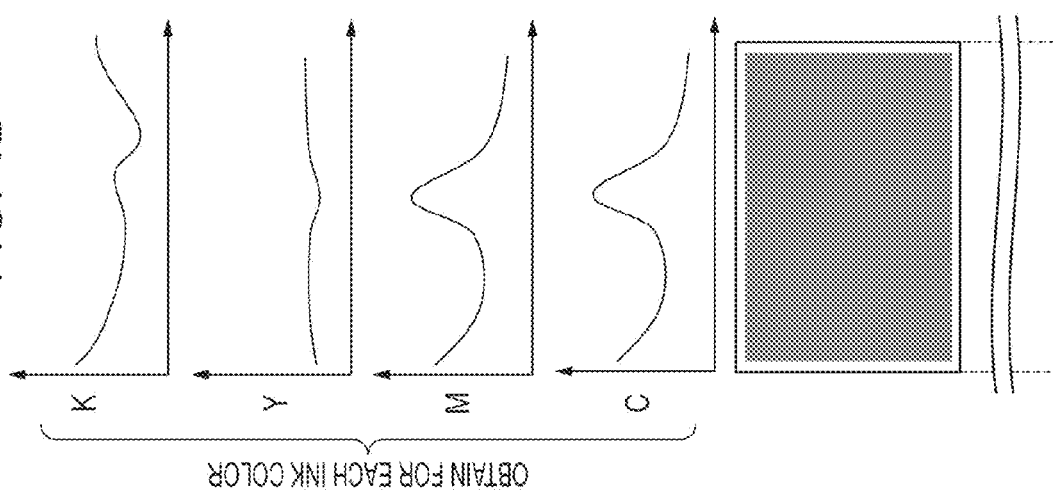
Figure 4A:
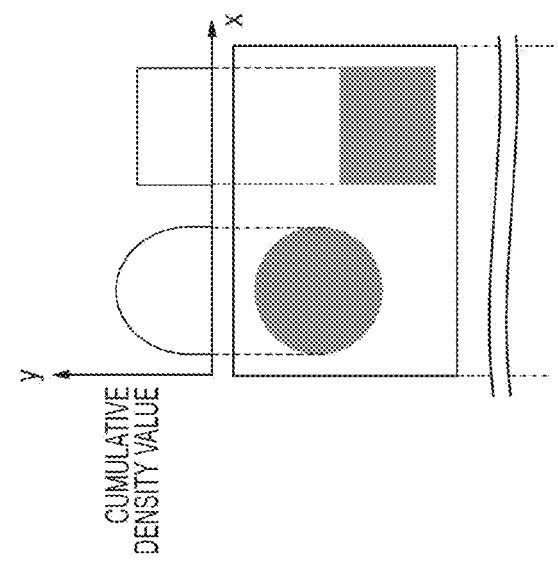

As illustrated in FIG. 4C, when a defect of a printed image is caused by defective discharging, the cumulative density value is lower than that of the correct image. Therefore, the image defect can be detected. In the example illustrated in FIG. 4C, differences in colors of cyan (C) and magenta (M) occur in the range from the line 401 to the line 402. In other words, defects in the colors of cyan and magenta occur in a range from the line 401 to line 402 on the image.

This method may be implemented in a system in which the test apparatus is either an area sensor camera or a line sensor camera.

Next, a method for executing the color separation will be described. The color separation processing may be executed similarly to the color conversion processing to be performed in the image processing unit 209 for generating print data. In order to generate print data, the color conversion is performed on print data for generating data of each ink color. The color separation is performed on an image acquired through an image test for the purpose of what-is-called inverse transformation for testing which ink has been used. More specifically, this method may be executed on the image acquired through an image test by using a color conversion table similar to the table used for generating print data, for example.

However, a color shift may possibly occur between print data being a correct image and the image acquired through an image test due to the performance of some image test apparatuses. Therefore, processing for normalizing an image acquired through an image test to print data in advance before the color separation. The normalization processing may be normalization on color information such as brightness and contrast in accordance with the print data.

Referring back to the flowcharts in FIG. 3, according to the aforementioned method, an image test is executed (step 312), and whether the image test result in OK is determined (step 313). If no image defect is detected as a result of the image test, it is determined that the result of the image test is OK (Yes in step 313). The test apparatus does not perform anything on the image, and the processing moves to step 314. On the other hand, if an image defect is detected as a result of the image test, it is determined that the result of the image test is NG (No in step 313). The test apparatus analyzes information on the image test result (step 315), and the processing moves to step 314. More specifically, from the test result, information regarding an ink color causing the image defect and information regarding a defective part on the line head are obtained. The information regarding an ink color causing the image defect is information regarding a color corresponding to a graph having a difference equal to or higher than the predetermined value on the cumulative density graph. In the example in FIG. 4C, because differences occur in colors of C and M, information regarding ink colors of C and M causing the image defect is obtained. The information regarding a defective part on a line head is information regarding a nozzle row corresponding to a range having a difference equal to or higher than a predetermined value on the cumulative density graphs in the line head. In the example in FIG. 4C, a nozzle row responsible for recording in the range from 401 to 402. The test apparatus transmits an instruction to print a defective-discharging test pattern to the printing apparatus (step 316). The instruction to print a defective-discharging test pattern includes image test result information, or image test result information is added thereto for the transmission. Based on the image test result information transmitted to the printing apparatus, a defective-discharging test pattern generated by the printing apparatus may be executed only on a specific region and a specific color, the details of which will be described below.

The printing apparatus stores the instruction to print a defective-discharging test pattern, not illustrated, on the RAM 213 such that it is readable. In step 304 above, the RAM 213 is checked, and if the instruction to print a defective-discharging test pattern is received on the RAM 213, it is determined that the defective-discharging test pattern is being printed.

In the printing apparatus, if the instruction to print defective-discharging test pattern has been received (Yes in step 304), processing for generating a defective-discharging test pattern is performed (step 305).

Next, the processing for generating a defective-discharging test pattern will be described with reference to FIG. 5. In the example illustrated in FIG. 5, it is detected from the image test result information that ink colors of C and K cause an image defect in a range from a row a to a row b on the line head and that ink colors of M, Y and K cause an image defect in a range from a row c to a row d.

The printing apparatus holds in advance on the HDD 214 defective-discharging test patterns for all ink colors in all regions of the line head, as indicated by the reference numeral 501. Such pattern data are usable for identifying the range and color(s) relating to defective discharging as a result of printing in all ink colors from all nozzles of the line head. According to this embodiment, a defective-discharging test pattern corresponding to a region and a color (or colors) necessary for testing defective discharging is generated from information regarding the range and color(s) relating to an image defect acquired in step 315. For example, the processing in step 315 allows acquisition of information as indicated by the reference numeral 502, More specifically, information regarding ink colors causing an image defect and information regarding nozzle rows corresponding to a range having the image defect in the perpendicular direction to the conveyance direction in the line head. Based on the information, the defective-discharging test pattern associated with the region and color(s) necessary for testing defective discharging may be extracted from print data of the defective-discharging test pattern for all ink colors in all regions of the line head as indicated by reference numeral 501 to generate a defective-discharging test pattern to be used in step 306. According to this embodiment, as indicated by reference numeral 503, a defective-discharging test pattern is generated which is associated with a nozzle row corresponding to an ink color causing an image defect in a region having the image defect.

According to this embodiment, the necessity for testing defective discharging by discharging all ink colors in all regions when an image defect is found is eliminated. Thus, the quantity of ink to be used for printing the defective-discharging test pattern can be saved. Furthermore, because the defective-discharging test pattern is not required to be printed for ink colors which do not cause an image defect, the width of the defective-discharging test pattern (width in the sheet conveyance direction) can be minimized, also minimizing paper waste.

Referring back to the flowcharts in FIG. 3, a defective-discharging test pattern for testing a specific range and a specific ink color on the line head is generated in step 305, and the defective-discharging test pattern is printed in step 306. Then, the processing returns to step 301. In other words, when the printing of the defective-discharging test pattern ends, the printing apparatus repeats the processing in step 301 to step 306 until no print job is queued for printing.

On the other hand, if it is detected that the defective-discharging test pattern reaches the test range (step 317), the test apparatus executes an image test on the defective-discharging test pattern (step 318). Then, the processing moves to step 319. The defective-discharging test pattern test may be executed based on the cumulative density values similarly to the image test method. The test result of the defective discharging test may include whether a defective discharging has occurred or not, not requiring information regarding the range and ink color(s) in a region having the defective discharging, unlike the image test result.

In step 319, based on the result of the defective discharging test, whether a defective discharging has occurred or not, that is, whether the defective discharging test result is OK or not is determined. If it is determined that a defective discharging has occurred in step 319 (No in step 319), that is, if the defective discharging test results in NG, an instruction to stop printing (hereinafter, print stop instruction) is given to the printing apparatus (step 320). Then, the processing in the test apparatus ends. Giving the print stop instruction allows the printing to be stopped before a large amount of image defect due to the serially occurring defective discharging occurs on the subsequent image, which can minimize failed printed material as much as possible. The print stop instruction may be an instruction command given from the test apparatus to automatically perform an operation equivalent to the print stop operation performed by the operating unit 103, for example. The printing apparatus in response to the print stop instruction stops operations of the rotation roller 111, feeding unit 101, winding unit 109 and so on associated with the printing processing immediately independently of the state such as an in-printing state and a job wait state of the printing apparatus. In other words, in the printing apparatus, the print stop instruction has the highest priority over other instructions. When the printing stops, an indication that the printing has been stopped due to defective discharging detected on the operating unit 103 may be presented, or a screen that prompts a user to perform head cleaning may be displayed. Alternatively, an indication of an instruction to pull out the continuous sheet may be displayed. The indication that the printing has been stopped because of defective discharging detected on the operating unit 103 may be notified by audio, for example.

On the other hand, if it is determined in step 319 that no defective discharging has occurred (Yes in step 319), that is, if the defective discharging test results in OK, an image from which an image defect has been detected is registered for re-printing with the printing apparatus (step 321). Thus, the image from which an image defect has been detected can be re-printed. After that, the processing moves to step 314. Next, a case where the defective discharging test results in OK will be described. A case where a defective discharging test using a defective-discharging test pattern results in OK though an image defect is found on an image based on print data occurs when the image defect is caused by defective discharging of a nozzle. For example, the cause may be an originally stained recording medium or an obstacle such as paper powder attached between a printed material and the test apparatus, for example. Because an image defect due to such a cause is overcome upon next printing, that is, because it is regarded as an accidental image defect, re-printing is performed without printing for maintenance of the line head. The method for registering re-printing may instruct the controller 117 to queue the whole print job containing identical print data or an arbitrary processing unit (such as a single page) for the printing apparatus, for example. In a case where it is configured that submitted print data stay in the HDD 214 in the printing apparatus, the re-printing may be instructed directly to the printing apparatus.

Next, handling of an image which is not normally output when Yes is determined in step 317 will be described. An image which is not normally output may be an image with NG as a result of an image test, an image which is being printed when a print stop is instructed due to occurrence of a defective discharging, or an image on which has been printed completely but is not tested when a print stop is instructed due to occurrence of a defective discharging, for example. The image on which has been printed completely but is not tested may be an image which has not reached the image test apparatus 115, that is, an image on a storage medium staying between the print heads 105 and the image test apparatus 115. An image test may be executed on an image on which has not been tested when printing is stopped, the image test may not be required because it may possibly have an image defect, as will be describe below.

Re-printing may be required on such an image. According to this embodiment, a unique number is given to each one image and is shared by the printing apparatus, test apparatus, and controller, and whether the status of each image is managed with respect to whether it has been normally output or not. Based on the unique number of the image and the status of the number, which image requires re-printing is determined. Which image on a recording medium wound by the winding unit 109 has not been normally output may be determined in a back-end process by a machine.

In step 314, whether there is an untested job is determined. If there is an untested job (Yes in step 314), the processing returns to S311. If there is no untested job (No in step 314), the processing in the test apparatus ends.

Next, a positional relationship on a recording medium between a printed image and a defective-discharging test pattern and sequences of the test apparatus and printing apparatus will be described in a system subject to a print stop (system involving up to step 320), for example, with reference to FIGS. 6A and 6B to 8A and 8B. FIGS. 6A and 6B to 8A and 8B illustrate a case where an image defect is detected on a printed image based on print data and an image defect is also detected on a defective-discharging test pattern. In FIGS. 6A and 6B to 8A and 8B, numbers within printed images (such as the number indicated by reference numeral 601 in FIG. 6A) represent the printed page numbers of images for convenience and are not components of the printed images.

Figure 6B:
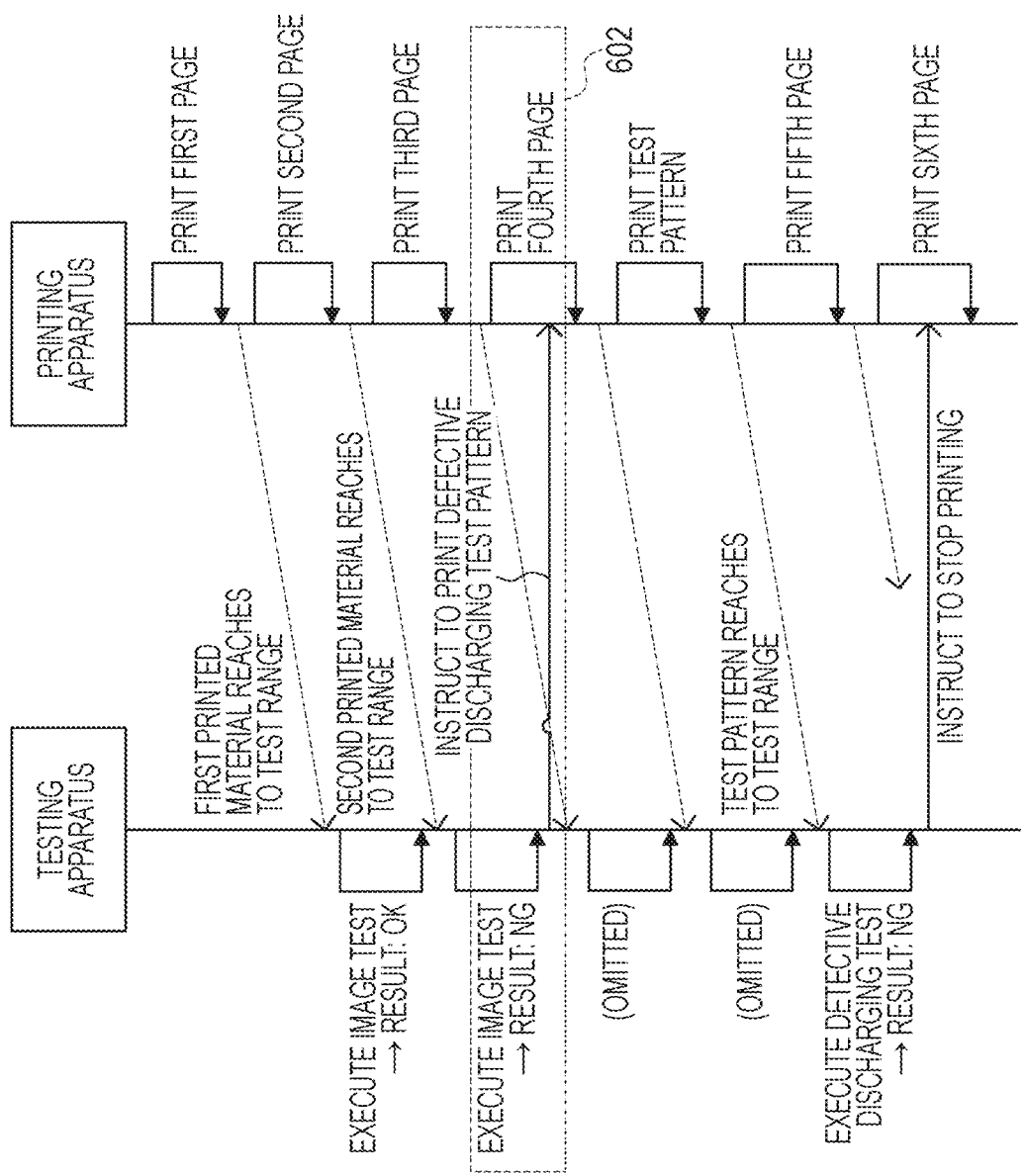

First, the time point when an image test results in NG will be described with reference to FIGS. 6A and 6B. Referring to the flowchart in FIG. 3, the processing in step 312 is executed, which result in No in step 313, and the processing in step 315 and step 316 is then executed. The page that a printing unit in the printing apparatus 119 is printing is subsequent to the page being tested by the test apparatus 115. According to this embodiment, for example, the test apparatus 115 tests the first page while the printing apparatus is executing printing on the second page after the printing on the first page completes. It should be noted that as the distance between the printing unit and the test apparatus increases, the difference increases between the positions (such as page numbers) where processing is performed on a continuous sheet by the apparatuses.

Immediately after an image defect is detected from the second image, the test apparatus 115 transmits image test information and an instruction to print a defective-discharging test pattern to the engine control unit 210 in the printing apparatus 119. Thereupon, the printing apparatus is printing the fourth page. On the sequence in FIG. 6B, a time point 602 in FIG. 6B corresponds thereto. FIG. 6A illustrates a positional relationship between images on a recording medium at that time. As described above, when the test apparatus transmits the instruction to print a defective-discharging test pattern, the printing apparatus is printing fourth image after printing the third image. Currently, the third image has not been tested.

With reference to FIGS. 7A and 7B, the time point will be described when a defective-discharging test pattern is printed in response to reception of an instruction to print a defective-discharging test pattern by the engine control unit 210 in the printing apparatus 119. In this example, image defects are caused by ink colors of C and M. Referring to the flowcharts in FIG. 3, it corresponds to the case where Yes is determined in step 304 and the processing in step 305 and step 306 is executed. A time point 604 corresponds thereto on the sequence in FIG. 7B. FIG. 7A illustrates a positional relationship of images on a recording medium thereupon. The printing unit in the printing apparatus 119 having received the instruction to print the defective-discharging test pattern while printing the fourth image prints the fourth image completely and, immediately after it, the defective-discharging test pattern is printed by interrupting before printing of the fifth image.

Figure 8B:
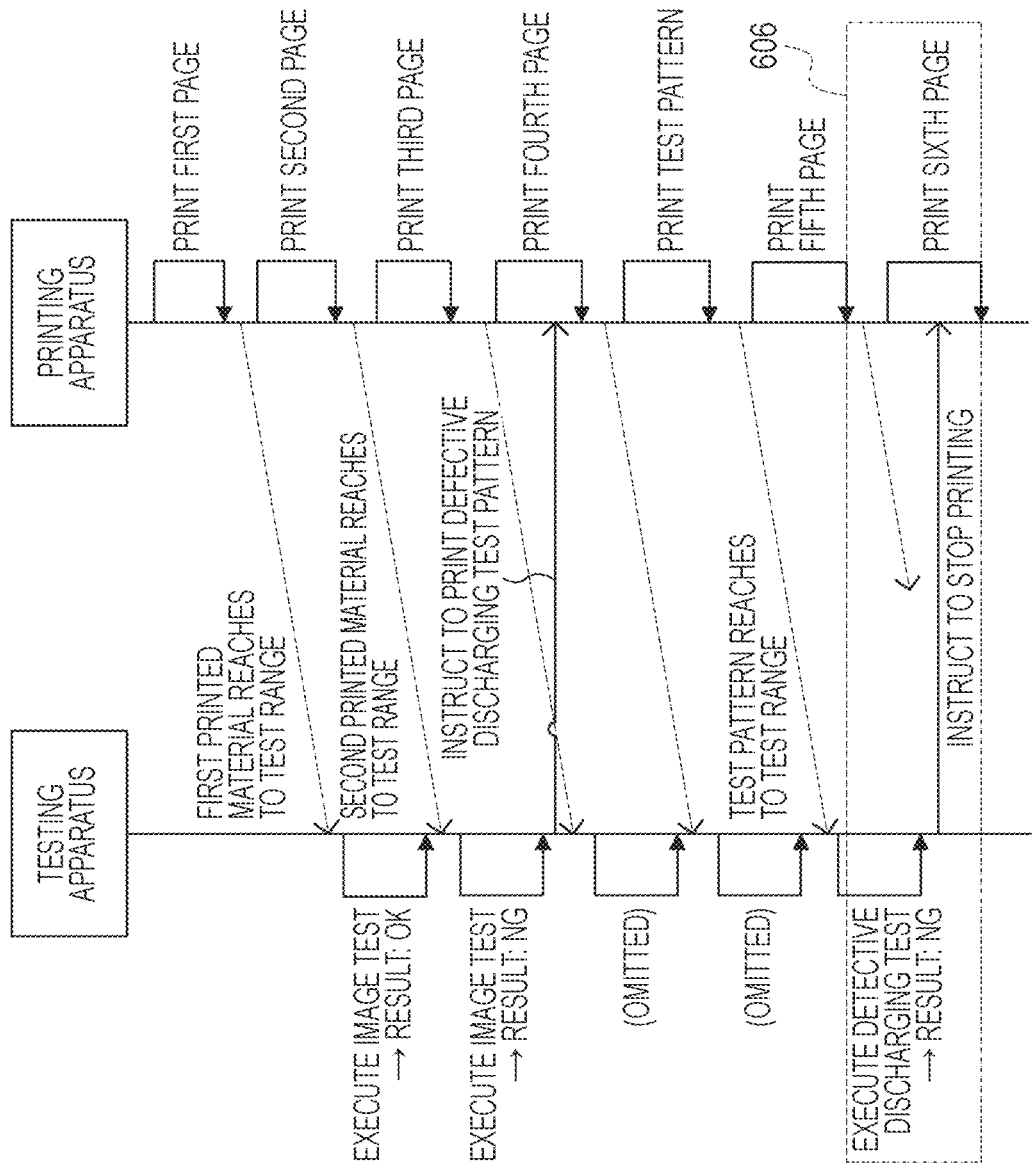

After that, when the defective-discharging test pattern reaches the test apparatus 115 and the defective discharging test results in NG, the test apparatus 115 issues the print stop instruction to the engine control unit 210 in the printing apparatus 119. With reference to FIGS. 8A and 8B, the processing upon then will be described. Referring to the flowchart in FIG. 3, Yes is determined in step 317, and processing in step 318 is executed. No is determined in step 319, and the processing in step 320 is executed. A time point 606 corresponds thereto on the sequence in FIG. 8B. FIG. 8A illustrates a positional relationship between images on a recording medium. In this example, the image test is executed on the third and fourth images from the time after the image test on the second image to the test of the defective-discharging test pattern. If the image test on the third and fourth images result in NG, the instruction to print the defective-discharging test pattern is to be issued at each of the corresponding times, but it is omitted on the sequence. In this manner, when one image test results in NG, the instruction to print a defective-discharging test pattern may not be issued even though the subsequent image test results in NG.

On the other hand, when the defective-discharging test pattern reaches the test apparatus and the defective discharging test results in OK, the instruction to register re-printing is issued (not illustrated), instead of the print stop instruction, at the time point 606 on the sequence in FIG. 8B. Referring to the flowchart in FIG. 3, it corresponds to the case where Yes is determined in step 317 and the processing in step 318 is executed, and Yes is determined in step 319 and the processing moves to step 321.

As described above, according to this embodiment, the instruction to print a defective-discharging test pattern is issued after an image defect is detected, and it may be tested to automatically determine whether the image defect is caused by a defective discharging or not. After that, if it is determined that the image defect is caused by a defective discharging, the printing operation is stopped. If not, the printing operation is continued. For example, an image defect caused by a recording medium having a stain or a scar or an obstacle such as dust and paper powder attached thereto may be overcome when the defective part of the recording medium is conveyed (on the next printed material). In other words, if the image defect is accidental, the printing operation should be continued from the viewpoint of productivity of the printing apparatus. According to this embodiment, after an image defect is detected, a defective-discharging test pattern is printed, and whether the defective-discharging test pattern has an image defect or not determined. As described above, if the image defect is caused by a recording medium, the defective-discharging test pattern is printed on a region different from the region where an image based on print data is printed. Thus, the test with the defective-discharging test pattern results in OK, and the printing operation can be continued. This does not reduce the operating rate of the printing apparatus and reduce the productivity either. The part having the image defect is discarded, and re-printing is executed to acquire the image corresponding to the part. On the other hand, an image defect caused by the printing apparatus such as a defective discharging of the print heads 105 may not be overcome even though a storage medium is conveyed, and images to be subsequently printed all have defects. In this case, the printing operation may be stopped once, and maintenance processing may be executed to recover the printing apparatus. When an image defect is caused by the printing apparatus as described above, the test based on a defective-discharging test pattern results in NG. Thus, the printing operation is stopped. Therefore, the productivity of the printing apparatus can be kept while the false-related costs and re-printing costs may be minimized.

According to this embodiment, a defective-discharging test pattern is printed and used for testing to determine whether the cause of the defect of the image printed based on print data is accidental and do not affect the subsequent printing or it occurs continuously and has effects on subsequent printed materials. If the image defect is determined as occurring accidentally, the printing operation is continued. If the image defect is determined as continuously occurring, the printing operation is automatically stopped. Thus, even when an image defect occurs, the operating rate of the apparatus may not be reduced as much as possible while minimizing failure and re-printing costs.

According to this embodiment, a defective discharging test is executed based on a printed defective-discharging test pattern corresponding to the region and ink color with an image defect. This is because the ink discharge positions of nozzles depend on the positions where the corresponding print heads are attached in a printing apparatus including a line head according to this embodiment and the part with an image defect may only require the test. When a defective discharge occurs at one nozzle, serial image defects occur in the direction orthogonal to the sheet conveyance direction. Testing the part having the image defects allows the ink amount and paper width (the amount of paper waste) used for printing a defective-discharging test pattern to be kept to the minimum. In other words, the failure and printing costs may be minimized.

The test method according to this embodiment allows the ink amount and paper width (the amount of paper waste) used for printing a defective-discharging test pattern to be kept to the minimum and improve the productivity, compared with a method which prints a defective-discharging test pattern periodically between images printed based on print data. The area for printing a defective-discharging test pattern may be reduced, and the time for printing the defective-discharging test pattern may be reduced.

According to this embodiment, the productivity of the printing apparatus may be kept, and the failure and re-printing costs may be minimized.

OTHER EMBODIMENTS

The fundamental configuration of the present invention is not limited to the aforementioned matters. For example, according to the embodiment, an ink color in which an image defect occurs and a range (region) having the image defect are identified to analyze the result of an image test. However, the present invention is not limited thereto, but one of them may be identified. In other words, an ink color in which an image defect occurs may only be identified, and a defective discharging test pattern may be generated and be printed in the ink color. Alternatively, a range having an image defect may be identified, and a defective discharging test pattern may be generated and be printed only with a nozzle for recording the range.

According to the embodiment, the printing apparatus includes the test apparatus, and the control unit 108 functions as a control apparatus configured to instruct printing of a test pattern to the printing unit. However, the present invention is not limited thereto. For example, a test apparatus may be provided externally to the printing apparatus. In a case where a device external to the printing apparatus such as the controller 117 controls so as to instruct printing of a test pattern, the external device may function as a control device.

Though a defective-discharging test pattern is to be printed according to the embodiment, the present invention is not limited thereto. Another test pattern is applicable for checking an image defect. For example, a patch for adjusting tint such as color shading may be printed, and the tint may be adjusted by converting the RGB values for correction, for example. In this case, if a test pattern is printed, and the printed test pattern is determined as OK, the subsequent printing processing may be implemented by using the corresponding correction value. If the printed test pattern is determined as NG, the printing processing may be stopped to shift to a maintenance mode.

According to the aforementioned embodiment, if a defective-discharging test pattern is determined as NG, the print stop instruction is to be transmitted. However, the present invention is not limited thereto. An adjacent nozzle neighboring to a nozzle in a range determined as causing defective discharging or an alternative nozzle to a nozzle in a range determined as causing defective discharging may be used if a plurality of nozzles are provided in the conveyance direction. Then, again, the defective-discharging test pattern is printed, and if the defective-discharging test pattern is still determined as NG, the print stop is instructed. If the defective-discharging test pattern is determined as OK, the subsequent printing processing may be executed by using such a neighboring nozzle or alternative nozzle.

The configuration of the printing apparatus 119 is not limited to that in the embodiment but may have other units and sensors. The printing apparatus 119 may include the controller 117.

According to the aforementioned embodiments, a printing apparatus handles a continuous sheet. However, an embodiment of the present invention is not limited thereto. The present invention is also applicable to a printing apparatus which handles cut sheets.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-245207, filed Dec. 3, 2014, which is hereby incorporated by reference herein in its entirety.

What is claimed is:

1. A control apparatus comprising:
   at least one processor and memory;
   a first determining unit that determines whether a defect in which target print quality is not acquired has occurred in an image based on print data printed on a sheet by a printing unit having print heads including a row of nozzles aligned in a direction crossing a sheet conveyance direction;
   an identifying unit that identifies at least one of a region and a color in which the defect occurs in the image if it is determined that the defect occurs in the image;
   a first instructing unit that instructs printing of a test pattern to a print control unit that controls the printing unit if the first determining unit determines that a defect has occurred in the image;
   a generating unit that generates the test pattern when an instruction transmitted by the first instructing unit is received by the generating unit based on the identified at least one of the region and color in which the defect occurs;
   a second determining unit that determines whether a defect occurs in the test pattern printed on the sheet by the printing unit based on the instruction from the instruction unit; and
   a second instructing unit that instructs stoppage of printing to the print control unit if the second determining unit determines that a defect has occurred in the test pattern,
   wherein the units are implemented upon execution of instructions stored in the at least one memory by the at least one processor.

2. The control apparatus according to claim 1, wherein the second instructing unit instructs the print control unit to re-print an image based on print data which is determined as causing a defect on the image by the first determining unit if the second determining unit determines no defect occurs in the test pattern.

3. The control apparatus according to claim 1, wherein the second instructing unit does not instruct stoppage of the printing unit if the second determining unit determines that no defect occurs in the test pattern.

4. The control apparatus according to claim 1, wherein the sheet is a continuous sheet; and
   the print control unit causes a test pattern to be printed subsequently to the image based on the print data on the sheet.

5. The control apparatus according to claim 1, further comprising the printing unit.

6. A printing system comprising:
   at least one processor and memory;
   a first determining unit that determines whether a defect in which target print quality is not acquired occurs in an image based on print data printed on a sheet by a printing unit having print heads, the print heads having a row of nozzles aligned in a direction crossing a sheet conveyance direction;
   an identifying unit that identifies at least one of a region and a color in which a defect occurs in an image if the first determining unit determines that a defect occurs in the image;
   a first instructing unit that instructs printing of a test pattern to the printing unit and transmit information on at least one of the region and color in which the defect occurs in the image and which is identified by the identifying unit if the first determining unit determines that the defect occurs in the image;
   a generating unit that generates a test pattern based on the information transmitted by the first instructing unit;
   a print control unit that causes the printing unit to print the test pattern generated by the generating unit on the sheet;
   a second determining unit that determines whether a defect occurs in the test pattern printed on the sheet by the printing unit;
   a second instructing unit that instructs stoppage of the printing unit if the second determining unit determines that a defect occurs in the test pattern, wherein the units are implemented upon execution of instructions stored in the at least one memory by the at least one processor.

7. The printing system according to claim 6, wherein the second instructing unit instructs the print control unit to re-print an image based on print data which is determined as causing a defect on the image by the first determining unit if the second determining unit determines that no defect occurs in the test pattern.

8. The printing system according to claim 6, wherein the second instructing unit does not instruct stoppage of the printing unit if the second determining unit determines that no defect occurs in the test pattern.

9. A control method comprising:
determining whether a defect occurs in which target print quality is not acquired in an image based on print data printed on a sheet by a printing unit having print heads having a row of nozzles aligned in a direction crossing a sheet conveyance direction;
identifying at least one of a region and a color in which the defect occurs in the image if it is determined that the defect occurs in the image;
instructing printing of a test pattern to a print control unit that controls the printing unit to print the test pattern if it is determined that a defect occurs in the image;
generating the test pattern based on the identified at least one of the region and color in which the defect occurs;
determining whether a defect occurs in a test pattern printed on the sheet by the printing unit based on the instruction from the instructing; and
instructing stoppage of printing to the print control unit if it is determined that a defect occurs in the test pattern.

10. The control method according to claim 9, wherein instructing the print control unit to re-print an image based on print data which is determined as causing a defect on the image if it is determined that no defect occurs in the test pattern.

11. The control method according to claim 9, wherein not instructing stoppage of the printing unit if it is determined that no defect occurs in the test pattern.

12. A non-transitory computer-readable recording medium storing a program causing a computer to execute instructions to perform the following steps:
determining whether a defect occurs in which target print quality is not acquired in an image based on print data printed on a sheet by a printing unit having print heads having a row of nozzles aligned in a direction crossing a sheet conveyance direction;
identifying at least one of a region and a color in which the defect occurs in the image if it is determined that the defect occurs in the image;
instructing printing of a test pattern to a print control unit configured to control the printing unit to print the test pattern if it is determined that a defect occurs in the image;
generating the test pattern based on the identified at least one of the region and color in which the defect occurs;
determining whether a defect occurs in a test pattern printed on the sheet by the printing unit based on the instruction from the instructing; and
instructing stoppage of printing to the print control unit if it is determined that a defect occurs in the test pattern.

\* \* \* \* \*